United States Patent [19]

Seward, III

[11] 4,025,191

[45] May 24, 1977

[54] PHOTOGRAPHIC CONTRAST ENHANCEMENT SYSTEM USING PHOTOCHROMIC GLASS

[75] Inventor: Thomas P. Seward, III, Corning, N.Y.

[73] Assignee: Corning Glass Works, Corning, N.Y.

[22] Filed: Mar. 12, 1975

[21] Appl. No.: 557,571

[52] U.S. Cl. .................................................. 355/71
[51] Int. Cl.$^2$ ......................................... G03B 27/76
[58] Field of Search ...... 355/71; 350/160 R, 160 P, 350/160 LC

[56] References Cited

UNITED STATES PATENTS

| | | | |
|---|---|---|---|
| 3,252,374 | 5/1966 | Stookey | 350/160 P |
| 3,598,471 | 8/1971 | Baldwin et al. | 355/71 X |
| 3,661,461 | 5/1972 | Dessauer | 355/71 X |
| 3,680,956 | 8/1972 | Custer | 355/71 |
| 3,734,598 | 5/1973 | Aiken | 350/160 LC |

Primary Examiner—Donald A. Griffin
Attorney, Agent, or Firm—Kees van der Sterre; Clinton S. Janes, Jr.; Clarence R. Patty, Jr.

[57] ABSTRACT

A method and system for processing a photographic negative to obtain photographic prints exhibiting enhanced contrast therefrom are described. A sheet of darkened optically bleachable photochromic glass, positioned between the negative and a selected photographic printing medium, is selectively bleached by light passing through the negative to form an image of the negative in the glass. Light of a wavelength effective to activate the photographic printing medium is then passed through the photographic negative and selectively bleached photochromic glass and focused to provide an enhanced contrast image of the photographic negative on the printing medium. A photographic print of enhanced contrast is thus produced.

1 Claim, 4 Drawing Figures

PHOTOGRAPHIC CONTRAST ENHANCEMENT SYSTEM USING PHOTOCHROMIC GLASS

BACKGROUND OF THE INVENTION

In photographic enlargement and reproduction it is often desirable to alter the contrast of a photograph. Whereas reduction of contrast can readily be achieved by adding diffused light over the entire image during exposure of the photographic printing medium, the achievement of contrast enhancement is not as simple. The use of high contrast photographic printing paper usually results in graininess and loss of resolution. Complex procedures involving computer controlled point-by-point dissection and reconstruction of the image can achieve this result, but a method which will be within the budget of the commercial or hobby photographer is needed.

Methods of achieving contrast enhancement with photochromic glasses utilizing spatial filtering techniques are known. Thus U.S. Pat. No. 3,598,471 to Baldwin et al describes a method for processing the Fourier transform of an object utilizing a photochromic glass to achieve contrast enhancement thereof. However a multiple lens system is required for the utilization of this method, and contact printing cannot be accomplished therewith.

Many types of photochromic glasses are presently known, but the most widely available photochromic glasses are of the kind described in U.S. Pat. No. 3,208,860 to Armistead and Stookey which is the basic patent in the field. Such glasses may briefly be described as silicate glasses comprising submicroscopic crystals of a silver halide dispersed in the glass which are reversibly darkenable by the action of light. The properties of these and other photochromic glasses vary depending upon composition and the nature of the photochromic constituents; however, many glasses are known which are darkenable under the action of ultraviolet light and bleachable (returnable to the undarkened state) under the action of longer wavelength red or infrared light.

Glasses which are darkenable under the action of heat and bleachable by the action of light are also known, being described for example in U.S. Pat. No. 3,734,754 to Randall and Seward.

Summary of the Invention

In accordance with the present invention, contrast enhancement is achieved by interposing a darkened sheet of optically bleachable photochromic glass between the photographic negative to be processed and the photographic printing medium to be employed. The sheet of photochromic glass is positioned in the printing system in a plane wherein an image of the photographic negative will be formed by light transilluminating the negative, such as immediately behind the photographic negative or immediately in front of the photographic printing medium. In a contact printing process the sheet of darkened photochromic glass may be placed between and thus immediately adjacent to both the negative and the printing medium.

The darkened sheet of photochromic glass is then selectively bleached, utilizing light of a wavelength effective to bleach the glass, by passing that light through the photographic negative and onto the photochromic glass. In this way an image of the negative is formed in the photochromic glass due to the selective bleaching thereof.

Finally, light of a wavelength which is effective to activate (provide a developable image in) the photographic printing medium is projected through the photographic negative and photochromic glass and onto that medium, being focused utilizing a lens if necessary, so that an image of the negative, as modified by the selectively bleached glass, is formed on the printing medium by light transilluminating the negative and glass. This modified image has a contrast which is enhanced over that of the photographic negative. The photographic printing medium, as activated by exposure to the enhanced contrast negative image, is then developed as necessary in a conventional manner to provide an enhanced contrast print of the negative.

Desirably, the light which is effective to bleach the darkened photochromic glass is of a wavelength similar to that of the light which is effective to activate the selected photographic printing medium, both being within or near the wavelength range of visible light. In that case both selective bleaching and activation of the printing medium may be accomplished by the same light source, with the printing medium being shielded from exposure during the bleaching step, if desired. Where the selected photochromic glass sheet has rapid bleaching characteristics, useful contrast enhancement may be achieved by simultaneously bleaching the glass and activating the printing medium during a single exposure period.

For the purposes of the present description the term photographic printing medium includes not only photographic printing papers and the like but also other photosensitive recording media including, for example, photographic films, optical image recording systems utilizing television image tubes, photoresist layers, or photosensitive glasses. The term photographic negative includes transparent photographic images, whether negative or positive in character, carrying real image information the contrast of which is to be enhanced. An optically-bleachable photochromic glass is a glass which is bleachable by visible or near-visible light.

The invention may be further understood by reference to the following detailed description thereof, and to the appended drawings showing, by way of example, specific preferred embodiments of the present invention.

DETAILED DESCRIPTION

Figure 1:
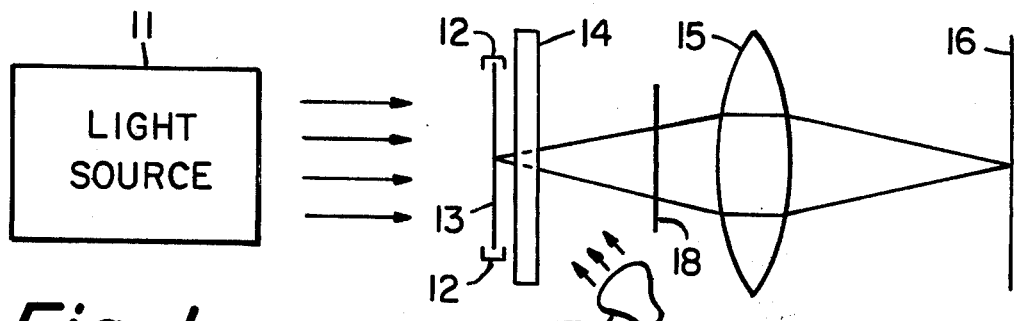
FIG. 1 shows a diagrammatic representation of a system for obtaining photographic prints of enhanced contrast utilizing photochromic glass in accordance with the invention.

In the preferred embodiment of the contrast enhancement system of the invention shown in FIG. 1 of the drawings, light source 11 is a source of visible light containing wavelengths which are effective to bleach (decrease the optical density of) a selected photochromic glass, and also containing wavelengths which are effective to activate a selected photographic printing medium. A position 12 in the path of the light beam emanating from source 11 is provided for a photographic negative 13. That position is situated such that a negative 13 will intercept light emanating from source 11 and be transilluminated thereby.

A sheet of optically bleachable photochromic glass 14 is provided behind (as viewed from the source) but immediately adjacent to the position 12 for the photographic negative. Sheet 14 is situated so that it intercepts light from source 11 transilluminating negative 13 and is itself transilluminated thereby. Preferably, sheet 14 is located immediately behind negative 13 so that a real image of the negative is formed on the sheet by light transilluminating the negative without the need for auxiliary focusing means. Of course, sheet 14 may also be located in an image plane separate from that of negative 13, in which case lens means not shown may be utilized to form an image of the negative on the glass. When the light forming this image is bleaching light, the photochromic glass sheet 14 is selectively bleached to provide an image in the sheet, whereas when the light is activating light for a photographic printing medium, the image in the sheet acts as a selective filter.

Behind the sheet of photochromic glass 14 in the path of light emanating from source 11 is provided lens means 15. This lens means is situated to intercept light from source 11 transilluminating a photographic negative 13 and glass sheet 14, and to focus this intercepted light to provide a real image of photographic negative 13, as modified by glass sheet 14, on a selected photographic printing medium 16. This real image, being modified by photochromic glass sheet 14, exhibits a higher level of contrast than does the photographic negative from which it is formed.

Photochromic glass 14 may be introduced into the system in the darkened condition so that selective optical bleaching by light passing through negative 13 to provide an image thereof in the glass is efficiently accomplished. Darkening of the glass prior to introduction is accomplished by any conventional means such as irradiation with a xenon arc lamp or any other suitable source of ultraviolet light.

Figure 1A:
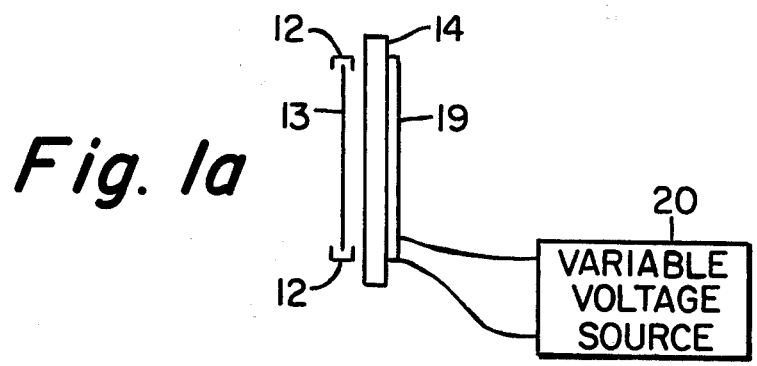
FIG. 1a shows a diagrammatic representation of modified glass darkening means useful in the system of FIG. 1.

Alternatively, means may be provided within the system for darkening the photochromic glass prior to or during use. Thus, as shown in FIG. 1, auxiliary ultraviolet light source 17 is optionally provided which will darken photochromic glass sheet 14 when activated. In addition, ultraviolet filter 18 is provided when the auxiliary ultraviolet light source 17 is utilized. This filter prevents ultraviolet light from reaching photographic printing medium 16.

Where a thermally-darkenable photochromic glass is utilized for glass sheet 14, ultraviolet light source 17 and filter 18 are replaced by electrically-conductive heating element 19 and variable voltage source 20 as shown in FIG. 1a. The heating element 19 may be an electrically-conductive coating which is transparent to the radiation utilized to activate printing medium 16, such as a tin oxide coating. The transmittance of the glass prior to and during printing may be controlled by controlling its temperature using the variable voltage source 20, just as in the case where an ultraviolet light source is used. Of course, the glass may also be darkened prior to use with separate heating means such as an oven, if desired.

The amount of contrast enhancement obtainable utilizing systems such as herein described varies depending upon the level of contrast achieved in the image produced by selective bleaching of the photochromic glass. This will depend in turn upon the darkening and bleaching characteristics of the glass.

As an illustration, it is presumed that it is desired to enhance the photographic contrast of a photographic negative comprising, for example, a first region 1 exhibiting a visible transmittance $T_1$ of 75% and a second region 2 exhibiting a visible transmittance $T_2$ of 25%. For the purposes of this description, the contrast C between these two regions of the photographic negative is defined in the conventional manner according to the formula:

$$C = \frac{I_1 - I_2}{I_1 + I_2} \quad (1)$$

wherein $I_1$ and $I_2$ are the relative intensities of light transmitted from a source through region 1 and region 2 of the photographic negative respectively. If the negative is illuminated by a light source of uniform intensity $I_o$, the contrast will be given by:

$$C = \frac{I_oT_1 - I_oT_2}{I_oT_1 + I_oT_2} = \frac{T_1 - T_2}{T_1 + T_2} \quad (2)$$

Thus for the above-described negative the contrast between region 1 and 2 calculated in accordance with expression (2) is about 0.5.

To obtain contrast enhancement of this negative in accordance with the invention, a sheet of darkened optically-bleachable photochromic glass is placed behind the negative with respect to a source of bleaching light, and the negative and glass are illuminated thereby. Illumination is continued for a time sufficient to bleach the section of photochromic glass behind the lighter region 1 of the negative to a transmittance value $\tau_1$ and the section of photochromic glass behind the darker region 2 of the negative to a transmittance value $\tau_2$. The net enhanced contrast $C_e$ of the negative photochromic glass combination is given by:

$$C_e = \frac{T_1\tau_1 - T_2\tau_2}{T_1\tau_1 + T_2\tau_2} \quad (3)$$

By comparison of this expression with expression (2) above it is seen that $C_e$ will be greater than C whenever $\tau_1$ is greater than $\tau_2$.

The degree of bleaching of a photochromic glass is generally an increasing function of the intensity of the light reaching it, i.e., the greater the intensity, the higher the transmittance for a given time of exposure. Hence, as long as there is some contrast in the original negative ($T_1 \neq T_2$), $\tau_1$ will always be greater than $\tau_2$, and contrast will be enhanced.

As an example of a useful glass, a lanthanum borate glass such as Example 39 set forth in U.S. Pat. No. 3,703,388 to Araujo et al. may be considered. Properly heated treated, this glass exhibits, in 0.15 mm cross-section, a visible transmittance of 89% in the clear (unactivated) state, a visible transmittance of 55% in the darkened state, and a visible transmittance of 73% following a 30-second bleaching treatment with visible and infrared light.

A sheet of the above-described lanthanum borate photochromic glass, being first fully darkened to a visible transmittance of 55%, may be interposed behind the described negative, and the negative and darkened glass may then be subjected to a source of bleaching light. Only light passing through the negative is allowed to reach the darkened glass. Illumination may be continued for a time sufficient to increase the transmittance value $\tau_1$ of the section of glass behind region 1 of the negative from 55% to 73%. Normally, this illumination interval will only be sufficient to increase the transmittance value $\tau_2$ of the section of glass behind the darker region 2 of the negative from 55% to about 62%.

As a consequence of this bleaching treatment, the level of visible transmittance through both region 1 of the negative and the partially-bleached photochromic glass behind region 1 ($T_1\tau_1$) will be about 55%. The level of transmittance through both region 2 of the negative and the partially-bleached photochromic glass behind region 2 ($T_2\tau_2$) wil be about 16%. These transmittance values may be utilized to calculate the effective contrast between regions 1 and 2 of the photographic negative, as modified by the selectively bleached photochromic glass, in accordance with expression (3) above. Based upon the relative intensities of light from a source of uniform intensity which would be transmitted through the negative and glass, a contrast value of about 0.56 is obtained. This corresponds to an increase in contrast of about 12% over the contrast of 0.5 exhibited by the negative alone.

As can be seen from the foregoing example, contrast in the image formed in the photochromic glass may be controlled by controlling the intensity and duration of bleaching light from the source passing through the photographic negative. Also, where an auxiliary ultraviolet light source is included as part of the system, contrast enhancement may be controlled by controlling the intensity of the ultraviolet light source and/or the exposure period. Continuous low or moderate level ultraviolet irradiation during the printing process may under some circumstances be utilized to inhibit bleaching of the photochromic glass by stray light and/or to limit the level of selective bleaching produced by bleaching light from the source. Similarly, controlled heating of thermally-darkening photochromic glass may be utilized during printing for these purposes.

Figure 2:
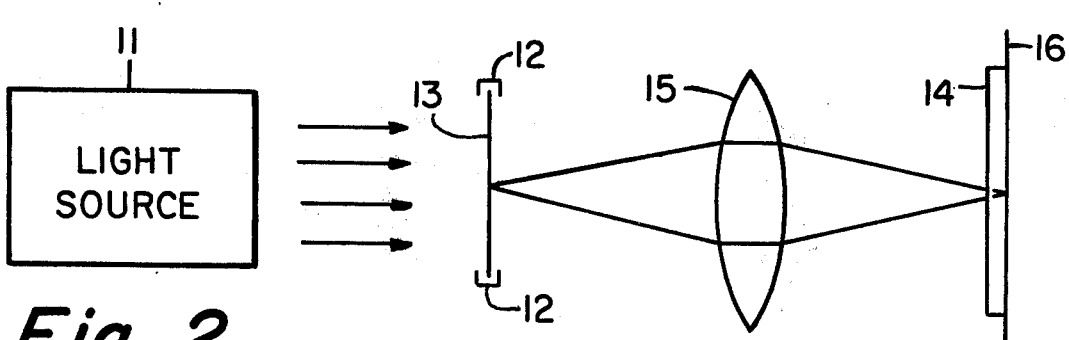
FIG. 2 shows a diagrammatic representation of an alternative system for obtaining photographic prints of enhanced contrast in accordance with the invention.
Figure 3:
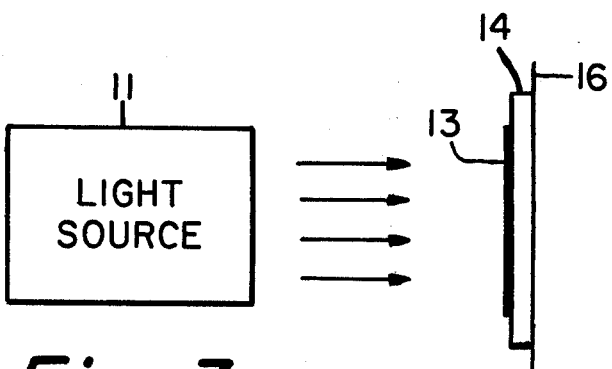
FIG. 3 shows a diagrammatic representation of a method for obtaining photographic prints of enhanced contrast by a contact printing process in accordance with the invention.

Other systems for processing a photographic negative to produce a photographic print exhibiting enhanced contrast are shown in FIG. 2 and FIG. 3 of the drawing.

In the system shown in FIG. 2, a beam of light from source 11 traverses position 12 and thus transilluminates a negative 13. Lens means 15 is provided behind the negative in the path of the light beam from source 11 to intercept the transilluminating light and focus that light as a real image of negative 13 on photographic printing medium 16. A darkened sheet 14 of bleachable photochromic glass is provided between lens means 15 and photographic printing medium 16, being situated immediately in front of printing medium 16 so that it intercepts and is transilluminated by light forming the image which is focused by lens means 15 on printing medium 16.

When the light forming the image is bleaching light primarily intended to selectively bleach sheet 14, printing medium 16 may optionally be shielded from exposure to bleaching light by shielding means not shown. During activation of the printing medium, this shielding means may be removed so that activating light transilluminating the selectively bleached photochromic glass will expose the printing medium. Alternatively, the printing medium may be translated into position after selective bleaching of the darkened photochromic glass has been accomplished.

In the system shown in FIG. 3, a darkened optically bleachable photochromic glass sheet 14 is interposed between photographic negative 13 and printing medium 16 and all are illuminated by light emanating from source 11. Inasmuch as all exposed elements are in essentially the same plane, no focusing means are required to provide real images of negative 13 on glass sheet 14 and printing medium 16. Again, shielding means not shown may be provided to shield the printing medium from exposure during selective bleaching of the photochromic glass, if desired.

As will be recognized from the foregoing description and drawings, resolution of the contrast enhanced negative image provided on the photographic printing medium is improved if the thickness of the darkened photochromic glass sheet is minimized. On the other hand, contrast enhancement is improved if high contrast is achieved in the image formed in the selectively bleached photochromic glass.

Any of the optically-bleachable photochromic glasses known in the prior art may be employed to enhance contrast in accordance with the present invention. However, for the above reasons it is preferred to utilize highly-darkenable photochromic glasses which exhibit relatively high contrast images upon selective bleaching even in thin cross section. Examples of such highly darkenable photochromic glasses include those described by Stookey in U.S. Pat. No. 3,449,103. Glass sheet having highly darkenable surface layers, such as described by Cramer et al. in U. S. Pat. No. 3,419,370, is also suitable. Many non-silicate photochromic glasses also have properties suitable for this use, including the lanthanum borate glasses described by Araujo et al in U.S. Pat. No. 3,703,388 .

I claim:
1. An optical system for processing a photographic negative to obtain a photographic print exhibiting enhanced contrast therefrom which comprises
   light source means providing a light beam containing at least some bleaching light, the wavelength of which is such that it decreases the optical density of a selected thermally darkenable photochromic glass, said beam further containing at least some activating light, the wavelength of which is such that it activates a selected photographic printing medium,
   a position for a photographic negative in the path of light emanating from the source, said position being selected so that light from the source transilluminates a photographic negative provided in said position,
   a sheet of thermally darkenable optically bleachable photochromic glass in the path of light emanating from the source, said sheet being disposed behind and immediately adjacent to the position for the photographic negative so that light transilluminating a negative in said position transilluminates and forms an image of the negative on the sheet,
   a transparent electrically-conductive tin oxide coating disposed on said sheet of thermally darkenable optically bleachable photochromic glass, said coating being connected to a variable voltage source and acting as a heating element to control the transmittance of said glass during the processing of said negative, and lens means in the path of light from the source, said lens means being disposed behind the position for a photographic negative and sheet of thermally darkenable photochromic glass and being situated to intercept light from the source transilluminating a phtotgraphic negative and the sheet of thermally darkenable photochromic glass and to focus the intercepted light to provide a real image of the photographic negative, as modified by the sheet of thermally darkenable photochromic glass, on a selected photographic printing medium.

* * * * *

UNITED STATES PATENT AND TRADEMARK OFFICE
CERTIFICATE OF CORRECTION

PATENT NO. : 4,025,191
DATED : May 24, 1977
INVENTOR(S) : Thomas P. Seward, III

It is certified that error appears in the above-identified patent and that said Letters Patent are hereby corrected as shown below:

Column 4, line 65, "heated" should be -- heat --.

Column 8, line 2, "phtotgraphic" should be -- photographic --.

Signed and Sealed this

First Day of November 1977

[SEAL]

Attest:

RUTH C. MASON
Attesting Officer

LUTRELLE F. PARKER
Acting Commissioner of Patents and Trademarks